G. A. DENNINGER.
VEHICLE DIRECTION INDICATOR.
APPLICATION FILED NOV. 23, 1914.
1,192,759.
Patented July 25, 1916.
2 SHEETS—SHEET 2.
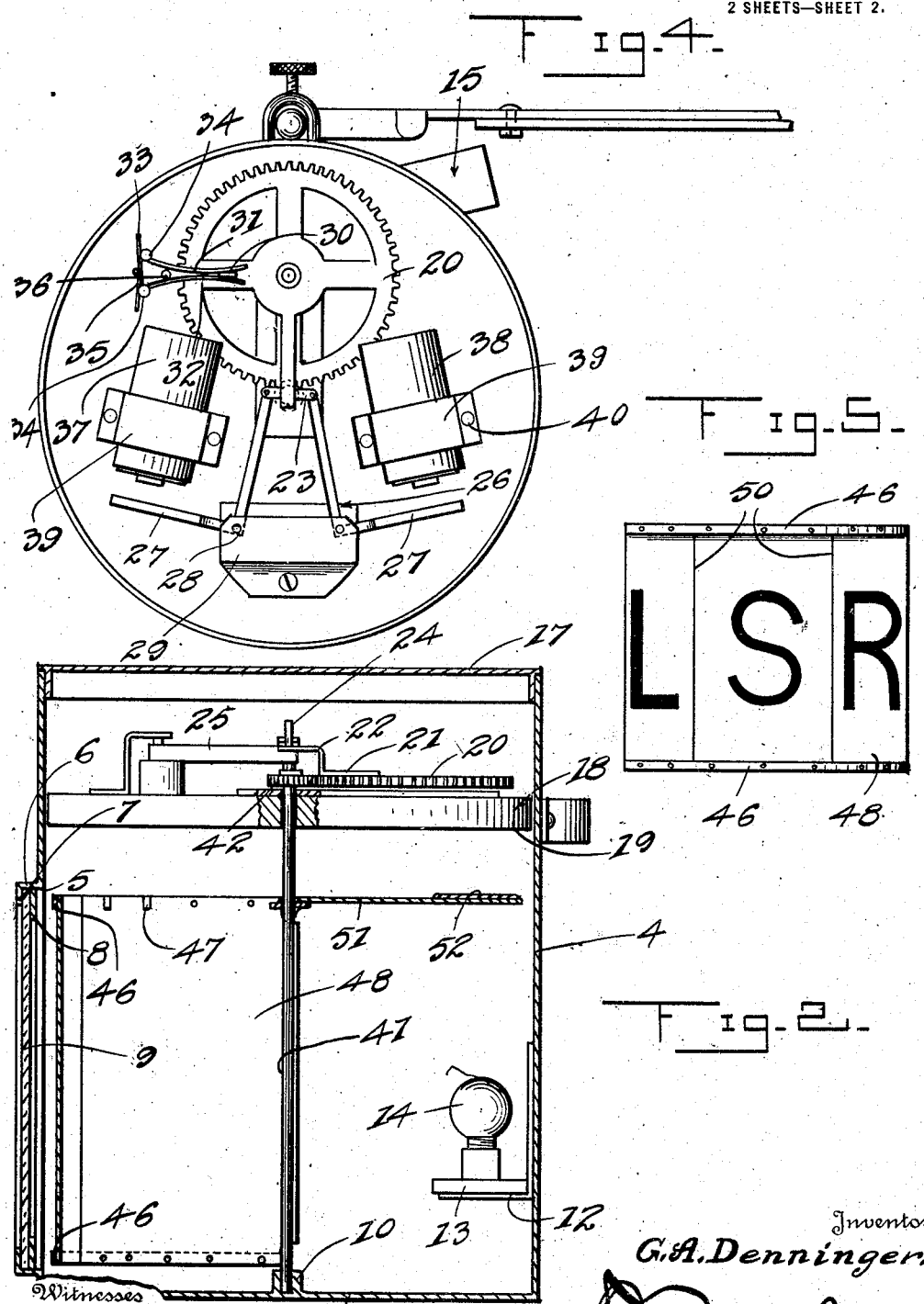

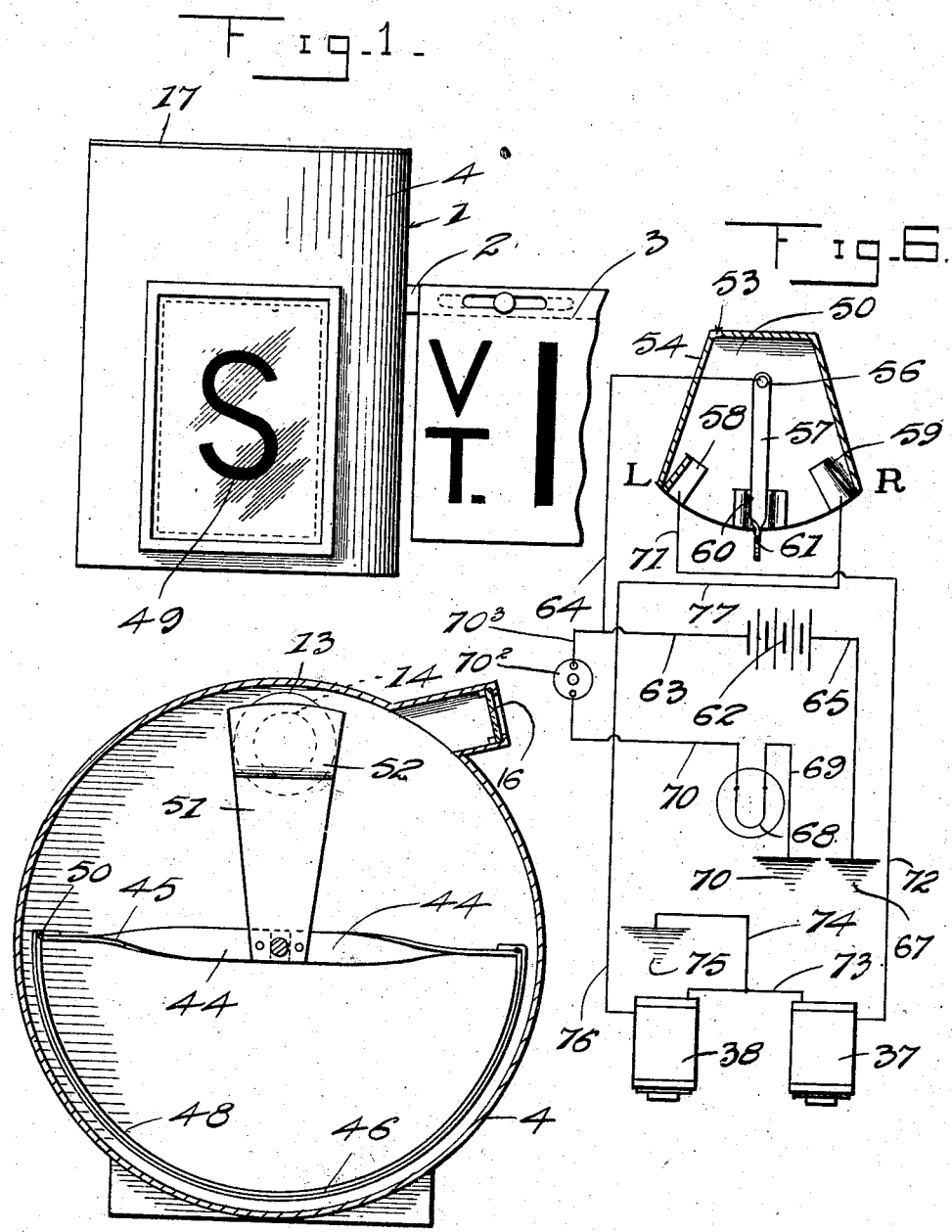

UNITED STATES PATENT OFFICE.

GEORGE A. DENNINGER, OF THERESA, WISCONSIN.

VEHICLE DIRECTION-INDICATOR.

1,192,759.   Specification of Letters Patent.   Patented July 25, 1916.

Application filed November 23, 1914. Serial No. 873,542.

*To all whom it may concern:*

Be it known that I, GEORGE A. DENNINGER, a citizen of the United States, residing at Theresa, in the county of Dodge and State of Wisconsin, have invented certain new and useful Improvements in Vehicle Direction-Indicators; and I do hereby declare the following to be a full, clear, and exact description of the invention, such as will enable others skilled in the art to which it appertains to make and use the same.

This invention relates to new and useful improvements in vehicle direction indicators, and has for its principal object to provide a device which will indicate to persons the intention of the driver of the vehicle on which the device is used.

Another object of the invention is to provide a simple and efficient device which will effectively prevent many of the accidents now due to the fact that pedestrians and others are not aware of the course which a vehicle will take.

A further and more specific object of the invention is to provide a device which may be secured to either end of the vehicle or to both ends if so desired, which will be clearly seen in the day time and may be illuminated at night to insure the same being operative at all times.

A still further object of the invention is to provide a device which may be controlled from the seat of the operator of the vehicle without in any way inconveniencing him.

With these and other objects in view, the invention consists in the novel combination and arrangement of parts which will be fully set forth in the following specification and accompanying drawings, in which, Figure 1 is a view in elevation of a vehicle indicator constructed in accordance with this invention showing the same as it would appear when in position adjacent the number tag of the vehicle, Fig. 2 is a vertical sectional view of the device, Fig. 3 is a horizontal sectional view taken on line 3—3 of Fig. 2, Fig. 4 is a top plan view showing the upper cover removed, Fig. 5 is a detail view of the inner drum, and Fig. 6 is a wiring diagram illustrating the switch for controlling the device, in detail.

Referring now to the drawings by characters of reference, the numeral 1 designates as an entirety the indicator which is secured on the bracket 2 in juxtaposition to the number tag 3. This indicator comprises the casing 4 having formed therein the aperture 5 which is surrounded by the flange 6, carrying at its outer edge the down-turned flange 7. A suitable retainer 8 is provided and is arranged to coöperate with the flange 7 in supporting the glass 9 in place. This glass is preferably transparent and is so designed as to render the drum illustrated in Fig. 5, visible. A central collar 10 is formed on the bottom wall 11 of the casing 4, and this collar extends inwardly and forms a bearing for the drum which will be more fully hereinafter described. In order that the drum may be illuminated at night there are provided the brackets 12 which support the lamp base 13 in which the bulb 14 is threaded, and it will thus be seen that when the device is in use after dark, the lamp may be lighted and thereby render the device visible. A suitable extension, designated generally by the numeral 15, is provided on the side of the casing 4 opposite the opening 5 and this extension opens into the casing and is provided at its outer terminal with the glass cover 16, which is so designed and arranged that the light from the inside of the drum will be directed through the casing and against the number plate 3, thus eliminating the necessity of having any separate illumination for the number plate. The upper end of the casing 4 is closed by means of the cover member 17 and between this cover plate and a suitable partition, which will be more fully hereinafter described, is carried the operating mechanism described in the following paragraph.

The operating mechanism referred to in the foregoing paragraph is designated generally by the numeral 18, and comprises the base member 19 on which the gear wheel 20 is rotatably mounted. This gear wheel 20 supports the member 21 which is provided at one end with the angle bracket 22, and this angle bracket pivotally supports the oppositely extending links 23 the opposite terminals of which are apertured to receive the pins 24. The pins 24 above referred to, are carried on the arms 25 of the bell crank designated generally by the numeral 26, the opposite arm of which, which is indicated by the numeral 27, is so shaped as to form an armature to be attracted by a magnet which will be more fully hereinafter described. These bell cranks are pivoted on the pivot pins 28 which extend through the bracket 29 and the base 19 so that the device will be held in its assembled position.

In order to hold the wheel 20 in a predetermined direction there is provided the upstanding lug 30 which is arranged to pass between the spring arms 31 and 32 which are arranged laterally thereof. These arms terminate at their outer ends in the loops 33 which surround the pins 34, which pins are secured to the base member 19, and suitable angular extensions 35 are formed on the coils 33 and engage the adjacent coil to hold the spring in the proper position. A suitable pin 36 is secured to the base member 19 and extends upwardly therefrom between the springs 31 and 32 and is designed to prevent the springs from throwing the wheel 20 into an inoperative position.

Secured to the upper face of the member 19 are the magnets 37 and 38 which are held in place by means of the clamps 39, which clamps are in turn secured by means of the screws 40 and are arranged to adjustably hold the magnets in the desired position. The cores of these magnets are designed to project in such position that they will attract the armature 27 and thereby operate the device.

Rotatable centrally of the casing 4 and extending downwardly to the base 19 and into the collar 10 is the shaft 41, which shaft extends throughout the upper face of the base 19 and carries the spur gear 42 by means of which the same is rotated. This spur gear meshes with the gear 20 and is arranged to be driven thereby, and it will thus be seen that the drum, which will be fully hereinafter described, will be rotated upon movement of the gear wheel 20. The drum above referred to is designated generally by the numeral 43 and comprises the arms 44 which extend in opposite directions from each end of the shaft 41 and are twisted intermediate their ends as at 45 to form supports for the semicircular members 46. These semicircular members are provided with suitable strips 47 which are designed to hold the translucent material 48 on which the letters 49 are formed, in proper position. Suitable wires 50 connect the rings 46 and are designed to assist in strengthening the same and eliminate the danger of breakage. In order to properly balance the device, there is provided the arm 51 carrying at its outer terminal the weight 52, which weight is adjusted so that the weight of the drum and material 48 will be equalized.

In order to control the operation of the device there is provided the switch designated generally by the numeral 53 which comprises the casing 54 having secured therein the insulating material 55. Pivotally secured to the insulating material at 56 is the switch arm 57 which coöperates with the contacts 58 and 59 in controlling the operation of the magnets hereinbefore referred to. In order to hold the arm 57 centrally, there is provided the plate 60 having formed therein the central notch 61 which is of sufficient width to receive the arm 57 in order to hold the switch in its inoperative position.

Having described the several detail parts of the device, it now remains to describe the operation and wiring diagram which is shown in Fig. 6. A suitable power supply 62 is provided and the current is taken therefrom by means of the wire 63 which is connected to the wire 64, which wire is in turn connected to the pivot point 56 of the arm 57. The wire 65 is connected to the wire 66, which in turn is connected to the ground 67, which is connected to the frame thus providing a distributer for the current. The lamp 68 which is connected by means of the wire 69 to the ground 70 is connected to the opposite pole of the battery by the wire 70′ which is connected to one pole of the switch $70^2$, the opposite pole of which is connected by the wire $70^3$ to the wire 64. The switch point 58 is connected to the wire 71 which is connected to the wire 72, which in turn is connected to the magnet 37, the opposite terminal of which is connected to the wire 73, which wire is connected at its opposite end to the magnet 38 and springing from the wire 73 is the branch wire 74 which terminates in the ground 75, which coöperates with the ground 67 in completing the circuit through the magnet. The opposite terminal of the magnet 38 to the one which is connected to the wire 73 is connected to the wire 76, which in turn is connected to the wire 77, the terminal of which is connected to the contact 59 of the switch 53. It will thus be seen that when the switch is thrown to either of the contacts 58 or 59, the respective magnet 37 or 38 will be energized by the current passing from the power source 62, through the wire 63, into the switch arm 57 from whence it passed to either the contact 58 or 59 and through either of the wires 71 or 77 according to which of the contacts is thrown in, thereby flowing through said wires and through the magnets 37 or 38 and out through the wire 74 to the ground 75, from which it passes to the ground 67 and back through the wire 66 to the battery. In order to illuminate the device the switch $70^2$ is operated thus permitting the current to flow from the battery through the wire 63 and wire $70^3$ through the switch $70^2$ and wire 70′ to one terminal of the lamp. The current then flows through the lamp and out of its opposite terminal into the wire 69 and through the grounds 70 and 67 through the wire 66 and back to the battery.

It will be apparent from the foregoing that when either of the magnets is energized, their respective armatures 27 are magnetized, thereby operating the arms thereof and swinging the wheel 20, thus causing the spur gear 23 to rotate and rotate the inner drum.

While in the foregoing there has been shown and described the preferred embodiment of this invention, it is to be understood that such changes may be made in the combination and arrangement of parts as will fall within the spirit and scope of the invention as defined in the appended claims.

What is claimed is:

1. A direction indicator comprising a casing having an opening therein, a base secured within the upper end of the casing, a vertical shaft journaled in said base and in the bottom of the casing, oppositely extending supporting arms secured to said shaft and twisted intermediate their ends, a semi-cylindrical drum consisting of transparent material secured to the arms, an arm secured to the shaft and to the supporting arms, a weight secured to the free end of said arm to counterbalance the drum, direction indication carried by the drum, means for oscillating the drum to bring certain direction indications in registration with said opening, and means for illuminating the drum.

2. A direction indicator comprising a casing having an opening therein, a base secured within the upper end of the casing, a vertical shaft journaled in said base and in the bottom of the casing, a semi-cylindrical drum carried by said shaft, means for counterbalancing said drum, strips secured to said drum to support translucent material on which direction indications are printed, wires secured to the drum to reinforce said translucent material, means for oscillating said drum to bring certain direction indications in registration with said opening, and means for illuminating said drum.

3. A direction indicator comprising a casing having an opening therein, a base secured within the casing, a shaft journaled in the bottom of the casing and in said base, a drum carried by said shaft and provided with direction indications thereon, a spur gear secured to the shaft and above said base, a gear wheel rotatably mounted on the base and meshing with said spur gear, electrical means for oscillating the gear wheel to move the drum to register said direction indications with said opening, means for normally holding said gear wheel at a predetermined position, and means for illuminating the drum.

4. A direction indicator comprising a casing having an opening therein, a base secured within the casing, a shaft journaled in the casing and in the said base, a drum carried by said shaft provided with direction indications thereon, a spur gear secured to the shaft, a gear wheel rotatably mounted on the base and meshing with said spur gear, an angular bracket secured to said gear wheel, oppositely extended links pivoted to said bracket and apertured, pins received by said apertures, bell crank arms secured to said pins, a second bracket secured to the base and pivotally supporting said bell crank arms, magnets secured to the base, means for alternatively energizing the magnets to attract one or the other bell crank arm, and means for normally holding the gear wheel at a predetermined position.

5. A direction indicator comprising a casing having an opening therein, a base secured within the casing, a shaft journaled in said casing and in the base, a drum provided with direction indications thereon carried by said shaft, a spur gear secured to the shaft, a gear wheel rotatably mounted on said base and meshing with said spur gear, means for oscillating the gear wheel to bring certain direction indications in registration with the opening, a lug formed on said gear wheel, a pair of pins secured to the base, spring arms coiled around said pins, and their corresponding ends adapted to bear on said lug, one on each side thereof, the other ends extending in opposite directions from said coils and each bearing upon the coils of the other, a pin secured to the base and extending between said spring arms to prevent them from drawing the gear wheel into an inoperative position.

In testimony whereof I affix my signature in presence of two witnesses.

GEORGE A. DENNINGER.

Witnesses:
WM. F. BRIEMANN,
ARTHUR GREINER.